US012718149B2

(12) United States Patent
Yamamoto et al.

(10) Patent No.: US 12,718,149 B2
(45) Date of Patent: Aug. 25, 2026

(54) LEARNING DATA GENERATING DEVICE, LEARNING DATA GENERATING METHOD, LEARNING DEVICE, LEARNING METHOD, DATA STRUCTURE, INFORMATION PROCESSOR, AND ACOUSTIC TREATMENT DEVICE

(71) Applicant: SONY GROUP CORPORATION, Tokyo (JP)

(72) Inventors: Yuki Yamamoto, Tokyo (JP); Yuji Tokozume, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 662 days.

(21) Appl. No.: 18/245,995

(22) PCT Filed: Sep. 7, 2021

(86) PCT No.: PCT/JP2021/032801

§ 371 (c)(1),
(2) Date: Mar. 20, 2023

(87) PCT Pub. No.: WO2022/074990

PCT Pub. Date: Apr. 14, 2022

(65) Prior Publication Data

US 2023/0351261 A1 Nov. 2, 2023

(30) Foreign Application Priority Data

Oct. 9, 2020 (JP) ................................ 2020-171522

(51) Int. Cl.
*G06N 20/00* (2019.01)

(52) U.S. Cl.
CPC .................................. *G06N 20/00* (2019.01)

(58) Field of Classification Search
None
See application file for complete search history.

(56) References Cited

U.S. PATENT DOCUMENTS

2011/0096839 A1* 4/2011 Gomila ................ H04N 19/157 375/E7.123
2023/0325678 A1* 10/2023 Fradkin .................... G06N 3/09 706/25

FOREIGN PATENT DOCUMENTS

JP 2005196020 A * 7/2005
JP 2011097268 A * 5/2011 ............ H04R 1/083

OTHER PUBLICATIONS

Ichikawa et al., "Audio mapping technology that converts larger scale audio data into acoustic model learning data for different acoustic environments", IBM Research-Tokyo, English Translation. (Year: 2014).*

(Continued)

*Primary Examiner* — Olabode Akintola
(74) *Attorney, Agent, or Firm* — CHIP LAW GROUP

(57) ABSTRACT

Provided is a learning data generating device that generates learning data used for learning of a machine learning model. The learning data generating device includes a data acquisition unit that acquires input data and a conversion unit that converts the input data into learning data by performing processing on the input data on the basis of a characteristic difference between a characteristic corresponding to a first condition and a characteristic corresponding to a second condition different from the first condition.

9 Claims, 13 Drawing Sheets

(56) References Cited

OTHER PUBLICATIONS

Takeda et al., "Acoustic model learning system that uses distributed and accumulated data". Proceedings of the 2004 Autum Meeting of the Acoustical Society of Japan, Sep. 2004, pp. 85-86. English Translation (Year: 2004).*

Ichikawa, et al., "Audio mapping technology that converts large-scale audio data into acoustic model learning data for different acoustic environments", Proceedings of the 2014 Autumn Meeting of the Acoustical Society of Japan, Sep. 1, 2014, pp. 11-14.

Takeda, et al., "Acoustic model learning system that uses distributed and accumulated data", Proceedings of the 2004 Autumn Meeting of the Acoustical Society of Japan, Sep. 2004, pp. 85-86.

International Search Report and Written Opinion of PCT Application No. PCT/JP2021/032801, issued on Nov. 16, 2021, 12 pages of ISRWO.

* cited by examiner

LEARNING DATA GENERATING DEVICE, LEARNING DATA GENERATING METHOD, LEARNING DEVICE, LEARNING METHOD, DATA STRUCTURE, INFORMATION PROCESSOR, AND ACOUSTIC TREATMENT DEVICE

CROSS REFERENCE TO RELATED APPLICATIONS

This application is a U.S. National Phase of International Patent Application No. PCT/JP2021/032801 filed on Sep. 7, 2021, which claims priority benefit of Japanese Patent Application No. JP 2020-171522 filed in the Japan Patent Office on Oct. 9, 2020. Each of the above-referenced applications is hereby incorporated herein by reference in its entirety.

TECHNICAL FIELD

The present disclosure relates to a learning data generating device, a learning data generating method, a learning device, a learning method, a data structure, an information processor, and an acoustic treatment device.

BACKGROUND ART

Conventionally, in a known technique of detecting a specific sound, whether a sound based on an audio signal obtained through microphones includes a specific sound, e.g., a human voice or a sound of a traveling vehicle (hereinafter referred to as a specific sound) is detected on the basis of the audio signal. For example, such a technique is proposed to shift to a conversation mode when a conversation of a headphone wearer is detected through a microphone provided for headphones (for example, see PTL 1).

CITATION LIST

Patent Literature

[PTL 1]
JP 2011-97268A

SUMMARY

Technical Problem

In this field, a detector for detecting a specific sound is desirably constructed at low cost.

An object of the present disclosure is to provide a learning data generating device or the like that constructs a detector for detecting a specific sound at low cost.

Solution to Problem

The present disclosure is, for example, a learning data generating device configured to generate learning data used for learning of a machine learning model, the device including: a data acquisition unit that acquires input data; and a conversion unit that converts the input data into learning data by performing processing on the input data on the basis of a characteristic difference between a characteristic corresponding to a first condition and a characteristic corresponding to a second condition different from the first condition.

The present disclosure may be an information processor including a machine learning model learned by using learning data generated by the learning data generating device.

The present disclosure may be an acoustic treatment device including: a specific sound detection unit that detects a specific sound on the basis of a machine learning model learned by using learning data generated by the learning data generating device; and a processing unit that performs predetermined processing when the specific sound is detected.

The present disclosure is, for example, a learning data generating method that generates learning data used for learning of a machine learning model, the method including:

causing a data acquisition unit to acquire input data; and causing a conversion unit to convert the input data into learning data by performing processing on the input data on the basis of a characteristic difference between a characteristic corresponding to a first condition and a characteristic corresponding to a second condition different from the first condition.

The present disclosure is, for example, a learning device including: a learning data selection unit that selects, from a plurality of data sets, learning data used for learning of a machine learning model; and a machine-learning-model generation unit that generates the machine learning model by using the selected learning data, wherein the data set includes predetermined data and metadata associated with the predetermined data, and the learning data selection unit selects the learning data with reference to the metadata.

The present disclosure is, for example, a learning method including: causing a learning data selection unit to select, from a plurality of data sets, learning data used for learning of a machine learning model; and causing a machine-learning-model generation unit to generate the machine learning model by using the selected learning data, wherein the data set includes predetermined data and metadata associated with the predetermined data, and the learning data selection unit selects the learning data with reference to the metadata.

The present disclosure is, for example, a data structure used for a learning data selecting device that selects, from a plurality of pieces of data, learning data used for learning of a machine learning model, the data structure including: predetermined data that is one of audio data, image data, and text data, and metadata associated with the predetermined data, wherein the learning data selecting device is used for processing for selecting, as the learning data, the predetermined data corresponding to the metadata matching learning-condition branch information.

DESCRIPTION OF EMBODIMENTS

Hereinafter, embodiments of the present disclosure will be described with reference to the drawings. The description will be made in the following order.

<Problem to be considered in present disclosure>
<First embodiment>
<Second embodiment>
<Third embodiment>
<Fourth embodiment>
<Fifth embodiment>
<Sixth embodiment>
<Seventh embodiment>
<Modification>

The embodiments described below are preferred specific examples of the present disclosure and the contents of the present disclosure are not limited to the embodiments.

Problem to be Considered in Present Disclosure

First, a problem to be considered in the present disclosure will be described to facilitate the understanding of the present disclosure. As described above, a technique of detecting a specific sound is proposed. The applicant has also proposed a technique described in Japanese Patent Application No. 2018-240642 as a technique of detecting a specific sound. This application discloses a technique of detecting a voice of a headphone wearer as a specific sound through a plurality of microphones provided for a wearable device, e.g., headphones. A detector for the detection obtains audio data on a target voice of the headphone wearer and nontarget sounds other than a voice of the headphone wearer (for example, voices other than a voice of the headphone wearer and ambient sounds) through a plurality of microphones and detects a voice of the headphone wearer by using a learned machine learning model (hereinafter referred to as a learned model as appropriate). In order to raise the accuracy of detection, machine learning with a large amount of audio data is preferably performed. Machine learning requires the acquisition of a large amount of audio data.

The above-mentioned detector exhibits high detection performance for additional audio data acquired under the same conditions (for example, the number of microphones, the layout of microphones, and the characteristics of microphones) as in the acquisition of the audio data. However, the audio data under different conditions has different characteristics from those in the generation of the detector, thereby deteriorating the detection performance. To prevent the deterioration, a large number of data sets to be acquired under the conditions needs to be reacquired each time the conditions are changed. This increases the construction cost of the detector. The embodiments of the present disclosure will be described in view of the foregoing problem.

First Embodiment

A first embodiment will be described below. In the following embodiment, headphones are described as an example of an acoustic treatment device unless otherwise specified. The present disclosure is also applicable to other acoustic treatment devices and information processors, e.g., a smartphone, an earphone, a television set, a game machine, various wearable devices, medical equipment, and a hearing aid.

Appearance Configuration Example of Headphones

Figure 1:
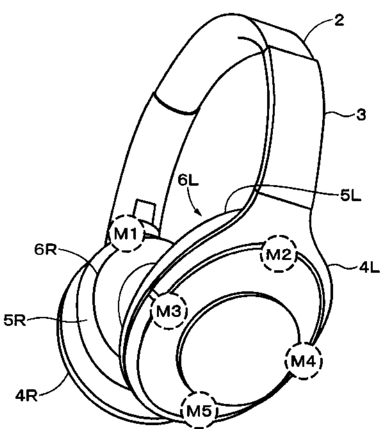
FIG. 1 is an explanatory drawing illustrating the configuration of the appearance of headphones according to a first embodiment.

FIG. 1 is an explanatory drawing illustrating the configuration of the appearance of headphones (headphones 1) according to an embodiment of the present disclosure. Configurations for the L (Left) channel are denoted by reference character L, whereas configurations for the R (Right) channel are denoted by reference character R.

As illustrated in FIG. 1, the headphones 1 are provided with, for example, a headband 2, sliders 3, hangers 4L and 4R, housings 5L and 5R, and ear pads 6L and 6R. The housings 5L and 5R are each provided with a driver unit (not illustrated).

The headband 2 formed so as to curve along the head of a wearer comes into contact with the top of the head of the wearer wearing the headphones 1, so that the headband 2 supports the overall headphones 1. The headband 2 is made of synthetic resins such as a plastic and a metal or the like and is flexible with predetermined rigidity and elasticity. Rubber or the like may be provided as a cushioning material on a part of the inner surface of the headband 2 that comes into contact with the top of the head of the wearer. Moreover, a hinge may be provided to fold the headphones 1 at the center when the headphones 1 are carried.

The slider 3 is provided at each end of the headband 2. The hanger (hanger 4L or 4R) is attached to a joint on one end of the slider 3. The sliders 3 are configured to be slidable along a guide member (not illustrated) fixed to each end of the headband 2 with an axis coinciding with the central axis of the headband 2. Sliding the sliders 3 along the guide member can move the hangers 4L and 4R away from or close to the headband 2. When the wearer wears the headphones 1, the positions of the sliders 3 are adjusted according to, for example, the head size of the wearer and a distance between each ear and the top of the head of the wearer. Thus, the wearer of the headphones 1 can obtain a fit corresponding to the physical characteristics and taste of the wearer. When the headphones 1 are not used, the sliders 3 are retracted so as to save a storage space.

The hangers 4L and 4R are each provided at the tip of the slider 3 with the joint (not illustrated) interposed therebetween and rotatably support the housings 5L and 5R.

The housings 5L and 5R each have a storage space therein and store, for example, a driver unit that converts an electric signal into a sound wave and outputs the sound wave. The housings 5L and 5R are made of, for example, synthetic resins such as a plastic.

The ear pads 6L and 6R are provided on the surfaces of the housings 5L and 5R so as to face the sides of the head of the wearer. The ear pads 6L and 6R interposed between the housings 5L and 5R and the sides of the head of the wearer function as cushioning members between the housings 5L and 5R and the sides of the head of the wearer. In other words, when the wearer wears the headphones 1, the ear pads 6L and 6R prevent the housings 5L and 5R, which are made of hard materials resistant to deformation, from directly coming into contact with the ears of the wearer and the sides of the head of the wearer and causing discomfort or pain to the wearer.

For example, the housings 5L and 5R of the headphones 1 are provided with a plurality of microphones. For example, the headphones 1 are provided with five microphones M1 to M5. In FIG. 1, an example of the layout of the microphones M1 to M5 is indicated by dotted circles. The number of microphones provided for the headphones 1 is not limited to 5. Any number of microphones may be provided as appropriate. The layout in FIG. 1 is exemplary and the microphones may be disposed at any proper positions. The microphones M1 to M5 may be disposed near the surface of the housing 5L or 5R or in the housing 5L or 5R. The microphones may be used for any purpose, for example, noise cancelling and a telephone conversation.

[Example of Internal Configuration of Headphones]

Figure 2:
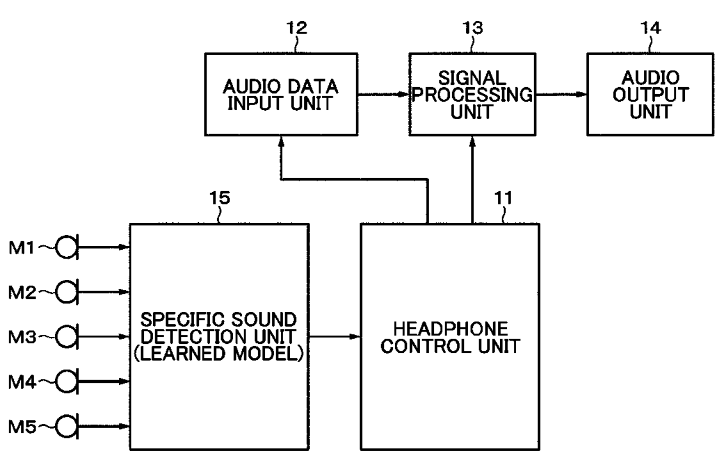
FIG. 2 is a block diagram illustrating an example of the internal configuration of the headphones according to the first embodiment.

FIG. 2 is a block diagram illustrating an example of the internal configuration of the headphones 1. The headphones 1 include a headphone control unit 11, an audio data input unit 12, a signal processing unit 13, an audio output unit 14, and a specific sound detection unit 15.

The headphone control unit 11 controls the overall headphones 1. The headphone control unit 11 is configured with, for example, a CPU (Central Processing Unit) and includes ROM (Read Only Memory) where a program to be executed by the headphone control unit 11 is stored and RAM (Random Access Memory) used as work memory or the like.

The audio data input unit 12 receives audio data (hereinafter also referred to as a source as necessary) to be reproduced in the headphones 1. The audio data is data obtained by electrically converting a sound and corresponds to a human voice, music, or an ambient sound. The source may be stored in memories such as a magnetic memory and a semiconductor memory or may be obtained through a network. In the former, the audio data input unit 12 has the function of reading the source from the memory. In the latter, the audio data input unit 12 acts as a communication unit that acquires a source from other devices through a network and includes a modulator-demodulator circuit and an antenna that correspond to the communication mode. Communications may be performed by wire or radio. Radio communications include LAN (Local Area Network), Bluetooth (registered trademark), and Wi-Fi (registered trademark) communications. The audio data of the source is output from the audio data input unit 12 to the signal processing unit 13.

The signal processing unit 13 performs known audio signal processing on the audio data supplied from the audio data input unit 12. The audio signal processing includes noise cancelling and equalizing. The audio data having been subjected to the signal processing by the signal processing unit 13 is output to the audio output unit 14.

The audio output unit 14 has a configuration corresponding to the foregoing driver unit and reproduces the audio data supplied from the signal processing unit 13. The audio output unit 14 includes, for example, a diaphragm and a magnetic circuit that vibrates the diaphragm.

The specific sound detection unit 15 detects a specific sound on the basis of the inputs of the microphones M1 to M5. The specific sound is, for example, a voice of the wearer of the headphones 1 but is not limited thereto. The specific sound detection unit 15 detects whether the audio data supplied from the microphones M1 to M5 includes a voice of the wearer of the headphones 1 by using, for example, a learned model (machine learning model). If a sound from the wearer of the headphones 1 is included, the specific sound detection unit 15 notifies the detection result to the headphone control unit 11.

In response to the notification from the specific sound detection unit 15, the headphone control unit 11 performs predetermined processing. For example, the headphone control unit 11 controls the signal processing unit 13 so as to stop reproduction or turn down the volume. The headphone control unit 11 may control the signal processing unit 13 such that a voice input to the headphones 1 is enabled to perform processing in response to a command that is a voice of the wearer of the headphones 1.

(Learned Model)

Figure 3A:
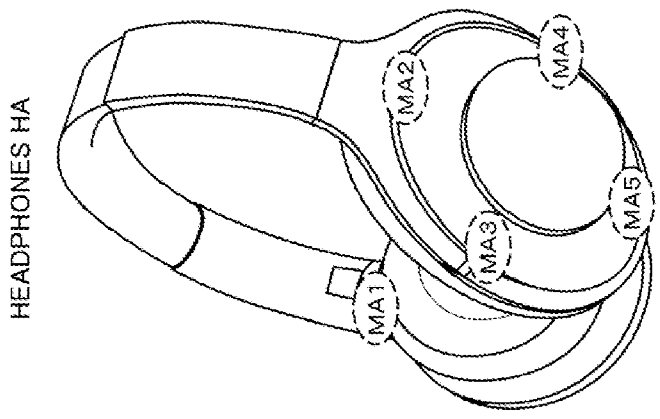
FIGS. 3A and 3B are reference diagrams for explaining a specific sound detection unit according to the first embodiment.
Figure 3B:
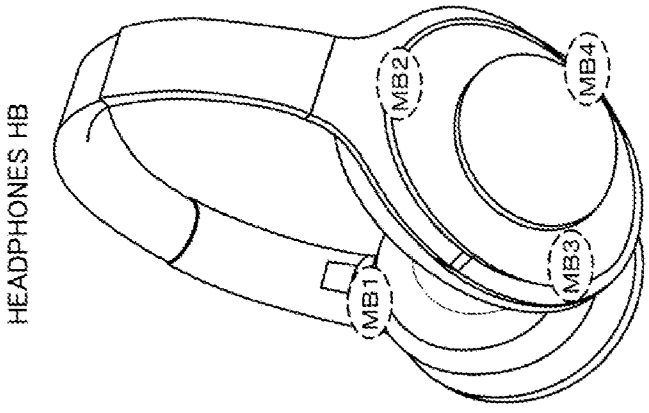

The learned model used in the specific sound detection unit 15 will be described below. The following description refers to headphones HA in FIG. 3A and headphones HB in FIG. 3B as appropriate. For example, the headphones HA include five microphones MA1 to MA5. The headphones HB include four microphones MB1 to MB4. The headphones HA and the headphones HB vary in the number of microphones, the layout of the microphones, and the characteristics of the used microphones. Such differences appear in, for example, a model change of the headphones. In this example, the headphones HA is an old model while the headphones HB is a new model. The headphones each have an internal configuration as illustrated in FIG. 2. If the headphones HA and headphones HB do not need to be distinguished from each other and the same goes for the headphones HA and HB, the headphones are collectively referred to as headphones 1.

(Configuration Example of Learning Device)

Figure 4:
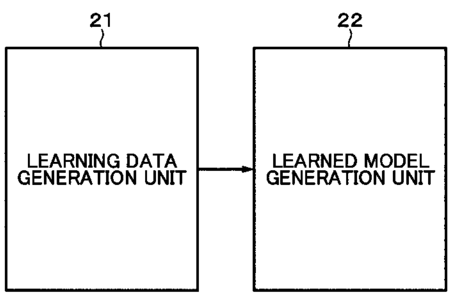
FIG. 4 is a block diagram illustrating a configuration example of a learning device according to the first embodiment.

The learned model that is used in the specific sound detection unit 15 is generated by a learning device (learning device 20) illustrated in FIG. 4. The learning device 20 includes, for example, a learning data generation unit 21 and a learned model generation unit 22. The learning device 20 may be disposed in the headphones 1 or may be included in a device (a personal computer or a cloud computer) different from the headphones 1.

The learning data generation unit 21 generates learning data for machine learning of the learned model generation unit 22 of the subsequent stage. The learned model generation unit 22 performs machine learning by using learning data generated by the learning data generation unit 21. For a machine learning technique employed by the learned model generation unit 22, for example, a neural network or deep learning is used. A neural network is a model that simulates a human cranial nerve circuit and is composed of three layers: an input layer, an intermediate layer (hidden layer), and an output layer. Deep learning is a model using a neural network with a multilayer structure and repeats characteristic learning in each layer, enabling learning of a complicated pattern hidden in a large amount of data. Deep learning is used for identifying, for example, an object in an image or a word in a voice. As a hardware structure for implementing such machine learning, a neurochip/neuromorphic chip according to the concept of a neural network may be used.

Problem settings for machine learning include supervised learning, unsupervised learning, semi-supervised learning, reinforcement learning, inverse reinforcement learning, active learning, and transfer learning. For example, in supervised learning, a feature amount is learned on the basis of learning data (teacher data) assigned with a label. This can derive a label of unknown data. In unsupervised learning, a large amount of learning data with no label is analyzed to extract a feature amount, and clustering is performed on the basis of the extracted feature amount. This enables analysis and prediction of a trend on the basis of a massive amount of unknown data. Semi-supervised learning is a combination of supervised learning and the unsupervised learning and is a method of learning a feature amount in supervised learning, providing a massive amount of training data in unsupervised learning, and repeating learning while automatically calculating the feature amount. Reinforcement learning handles a problem where an agent in a certain environment observes a current state and determines an action to be taken. The agent learns a reward from the environment by selecting an action and learns a method of maximizing the reward through a series of actions. In this way, learning of an optimum solution in an environment can reproduce human judgment and cause a computer to learn more excellent judgment than human judgment.

A learned model that is generated by the learned model generation unit 22 in an old model is a learned model optimized for the specific sound detection unit 15 of the headphones HA. At this point, the headphones HB as a new model has a different number of microphones from the headphones HA. In this case, as described above, the accuracy of detection of a specific sound decreases when the learned model optimized for the headphones HA is used for the specific sound detection unit 15 of the headphones HB. To address the problem, learning data for generating the learned model to be used in the specific sound detection unit 15 of the headphones HB is acquired from scratch, leading to low efficiency. Thus, in the present embodiment, the learning data generation unit 21 is provided to generate, on the basis of learning data for the headphones HA, learning data for generating the learned model to be used in the specific sound detection unit 15 of the headphones HB.

(Configuration Example of Learning Data Generation Unit)

Figure 5:
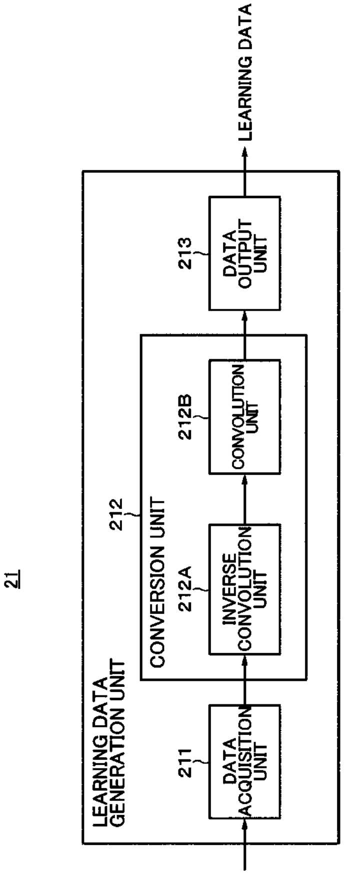
FIG. 5 is a block diagram illustrating a configuration example of a learning data generation unit according to the first embodiment.

FIG. 5 is a block diagram illustrating a configuration example of the learning data generation unit 21. The learning data generation unit 21 may be configured as a functional block of the learning device 20 as in the present example or may be configured as a single device (learning data generating device).

The learning data generation unit 21 includes, for example, a data acquisition unit 211, a conversion unit 212, and a data output unit 213. The data acquisition unit 211 acquires input data. Specifically, the data acquisition unit 211 acquires learning data (hereinafter referred to as a data set of the headphones HA as appropriate) used in the generation of the learned model to be used in the specific sound detection unit 15 of the headphones HA. In the following description, it is assumed that the learned model to be used in the specific sound detection unit 15 of the headphones HA has been generated and the data set of the headphones HA is known. The data acquisition unit 211 acquires the data set of the headphones HA by reading from memory or through communications.

The conversion unit 212 converts input data into learning data by performing processing on the input data acquired by the data acquisition unit 211, on the basis of a characteristic difference between a characteristic corresponding to a first condition and a characteristic corresponding to a second condition different from the first condition. The conversion unit 212 includes, for example, an inverse convolution unit 212A and a convolution unit 212B. A specific example of processing performed by the conversion unit 212 will be described later.

The data output unit 213 outputs the learning data (hereinafter referred to as a data set of the headphones HB as appropriate) obtained by the conversion of the conversion unit 212, to the learned model generation unit 22.

(Processing Performed by Conversion Unit)

A specific example of processing performed by the conversion unit 212 will be described below. A sound acquired by the headphones 1 is assumed to be a voice of the wearer of the headphones, a voice from a person other than the wearer of the headphones, and an ambient sound (e.g., a sound of an electronic device or an automobile near the headphones) other than the voice. Processing to be performed on the voices and the sound by the conversion unit 212 will be described below.

"Processing on the Wearer of the Headphones"

When a voice of the wearer of the headphones is acquired through a plurality of microphones, acquired audio data has the following characteristics (features).

The closer to the mouth of the wearer of the headphones, the larger the amplitude of audio data acquired through the microphones. This characteristic is referred to as an inter-microphone amplitude characteristic.

The closer to the mouth of the wearer of the headphones, the faster the audio data arrives through the microphones. This characteristic is referred to as an inter-microphone time characteristic.

The audio data is acquired according to the frequency characteristics of the microphones. This characteristic is referred to as a frequency characteristic of each microphone.

In order to numerically obtain these characteristics, for example, an impulse response may be acquired. A speaker is placed at the position of the mouth with respect to the headphones, and then a TSP (Time Stretched Pulse) signal is reproduced from the speaker. The reproduced TSP signal is recorded through the microphones temporally in synchronization with the reproduction of the TSP signal, and an impulse response is obtained for each of the microphones from the audio data acquired through the microphones. The TSP signal may be acquired with the headphones attached to a dummy head having speakers for replicating the propagation of a human voice.

An impulse response is obtained for each of the headphones HA and the headphones HB, so that an impulse response can be obtained for each of the microphones disposed in the headphones. The impulse responses indicate the inter-microphone amplitude characteristics of a sound emitted from the position of a mouth relative to the headphones, inter-microphone time characteristics, and the frequency characteristics of each microphone.

Subsequently, by using the obtained impulse responses of the headphones HA and the headphones HB, the data set of the headphones HA is converted and the data set of the headphones HB is generated. First, for the microphones provided for the headphones HA and the headphones HB, a channel pair of the adjacent microphones is set (pairing).

For example, channel pairs are set for the microphone MA1 of the headphones HA and the microphone MB1 of the headphones HB, the microphone MA2 of the headphones HA and the microphone MB2 of the headphones HB, the microphone MA3 of the headphones HA and the microphone MB3 of the headphones HB, and the microphone MA4 of the headphones HA and the microphone MB4 of the headphones HB. In the present example, a sound picked up by the microphone MA5 is not used.

The conversion unit 212 performs conversion for each of the channel pairs. For example, audio data acquired by the microphone MA1 of the headphones HA (audio data corresponding to a voice of a known wearer of the headphones) is acquired by the data acquisition unit 211 and then is supplied to the conversion unit 212. The inverse convolution unit 212A of the conversion unit 212 performs inverse convolution on the audio data by the impulse response of the microphone MA1. The convolution unit 212B then performs convolution on the resultant audio data by the impulse response of the microphone MB1 paired with the microphone MA1. Through this processing, audio data on a voice of the wearer of the headphones in the data set of the headphones HA can be converted from the transfer characteristic of the headphones HA to the transfer characteristic of the headphones HB. This obtains audio data on a voice of the wearer of the headphones in the data set of the headphones HB. The channel pair of the microphone MA1 and the microphone MB1 was described. The same processing is performed on other channel pairs.

"Processing on Voices of Persons Other than the Wearer of the Headphones"

When voices of persons other than the wearer of the headphones are acquired through the microphones, audio data on the voices has the following features.

- The closer to the mouths of persons other than the wearer of the headphones, the larger the amplitude of audio data acquired through the microphones (inter microphone amplitude characteristics).
- The closer to the mouths of persons other than the wearer of the headphones, the faster the audio data arrives through the microphones (inter-microphone time characteristics).
- The audio data is acquired according to the frequency characteristics of the microphones (frequency characteristics of each microphone).

In order to numerically obtain these characteristics, an impulse response may be acquired. Unlike a voice of the wearer of the headphones, voices of persons other than the wearer of the headphones are likely to be emitted from various positions relative to the headphones. Thus, speakers are disposed at various positions, and TSP signals are reproduced from the speakers to obtain impulse responses. The obtained impulse responses are associated with position information on the speakers. A dummy head having speakers for replicating the propagation of a human voice may be used.

In the subsequent processing, substantially the same processing is performed as in the case of a voice of the wearer of the headphones. Specifically, an impulse response is selected in consideration of the position information on the speakers. For example, audio data acquired through the microphone MA1 of the headphones HA (audio data corresponding to voices of persons other than a known wearer of the headphones) is acquired by the data acquisition unit 211 and then is supplied to the conversion unit 212. The inverse convolution unit 212A of the conversion unit 212 performs inverse convolution on the audio data by the impulse response of the microphone MA1. The impulse response of the microphone MA1 is selected such that the associated position information on the speakers indicates a position close to the position of a sound source (the position of the mouth of a person other than the wearer of the headphones) when the audio data is acquired through the microphone MA1. The convolution unit 212B then performs convolution on the resultant audio data by the impulse response of the microphone MB1 paired with the microphone MA1. The impulse response of the microphone MB1 is selected such that the associated position information on the speakers indicate a position close to the position of a sound source (the position of the mouth of a person other than the wearer of the headphones) when the audio data is acquired through the microphone MA1. Through this processing, audio data on voices of persons other than the wearer of the headphones in the data set of the headphones HA can be converted from the transfer characteristic of the headphones HA to the transfer characteristic of the headphones HB. This obtains audio data on voices of persons other than the wearer of the headphones in the data set of the headphones HB. The channel pair of the microphone MA1 and the microphone MB1 was described. The same processing is performed on other channel pairs.

"Processing on Ambient Sound"

When ambient sounds are acquired through the microphones, audio data on the ambient sounds generally has the following features.

- Audio data acquired through the microphones has substantially the same amplitude (inter-microphone amplitude characteristics).
- Sound arrives at all the microphones at substantially the same speed (inter-microphone time characteristics).
- The audio data is acquired according to the frequency characteristics of the microphones (frequency characteristics of each microphone).

Unlike in the case of a voice of the wearer of the headphones or voices of persons other than the wearer of the headphones, only the measurement of frequency characteristics for each microphone is necessary. Thus, for each of the microphones, a TSP signal is reproduced at the same distance from the microphone and in the same direction as the microphone, and the impulse response of the microphone is obtained. The subsequent processing is the same as that of a voice of the wearer of the headphones. For example, audio data acquired through the microphone MA1 of the headphones HA (audio data corresponding to a known ambient sound) is acquired by the data acquisition unit 211 and then is supplied to the conversion unit 212. The inverse convolution unit 212A of the conversion unit 212 performs inverse convolution on the audio data by the impulse response of the microphone MA1. The convolution unit 212B then performs convolution on the resultant audio data by the impulse response of the microphone MB1 paired with the microphone MA1. Through this processing, audio data on voices of persons other than the wearer of the headphones in the data set of the headphones HA can be converted from the transfer characteristic of the headphones HA to the transfer characteristic of the headphones HB. This obtains audio data on an ambient sound in the data set of the headphones HB. The channel pair of the microphone MA1 and the microphone MB1 was described. The same processing is performed on other channel pairs.

As described above, the conversion unit 212 performs processing based on a characteristic difference between a characteristic corresponding to the first condition and a characteristic corresponding to the second condition different from the first condition. In this case, the characteristic corresponding to the first condition is the layout of a first sensor, specifically, the first transfer characteristic corresponding to the layout of the microphones on the headphones HA. The characteristic corresponding to the second condition is the layout of a second sensor, specifically, the second transfer characteristic corresponding to the layout of the microphones on the headphones HB. As described above, the transfer characteristics include at least one of an amplitude characteristic, a time characteristic, and the frequency characteristics of the microphones. The transfer characteristics may include the directional characteristics of the microphones.

The data set of the headphones HB is output from the data output unit 213 to the learned model generation unit 22, the data set being obtained by the conversion by the conversion unit 212. Through machine learning, the learned model generation unit 22 generates a learned model for detecting audio data corresponding to a voice of the wearer of the headphones from the data set of the headphones HB. The generated learned model is set and used for the specific sound detection unit 15 of the headphones HB.

Through the foregoing processing, the data set of the headphones HA is converted to acquire the data set of the headphones HB (the data set includes a voice of the wearer of the headphones, voices of persons other than the wearer of the headphones, and ambient sounds in the present example). Thus, even if the number or layout of microphones is changed in a model change of the headphones, the reacquisition of a data set corresponding to the new headphones is not necessary. In other words, the specific sound detection unit 15 can be constructed at low cost.

Modification of First Embodiment

For example, the first embodiment can be modified as follows:

The above description illustrated the data set and the learned model that are configured to generate the detector for detecting a voice of the wearer of the headphones. The foregoing embodiment is also applicable to a data set and a learned model that are configured to generate a detector for detecting other voices and sounds. The type of the data set is not limited to a voice of the wearer of the headphones, voices of persons other than the wearer of the headphones, and ambient sounds if the type of the data set is determined according to the application.

In the foregoing embodiment, the data set of the headphones HB may be generated by conversion through a neural network or the like instead of conversion using an impulse response. In other words, the configuration of the conversion unit 212 can be modified according to the contents of conversion.

In the foregoing embodiment, the channel pair is formed by the adjacent microphones. The channel pair is not limited thereto. For example, audio data on multiple channels may be converted to audio data on a single channel. Alternatively, instead of the one-to-one correspondence, the channel pair may be formed by, for example, multiple microphones and a single microphone or multiple microphones and multiple microphones.

In the foregoing embodiment, the microphone was described as an example of a sound sensor. Other sensors capable of acquiring audio data may be used instead. Other sensors include, for example, a bone-conduction sensor, an acceleration sensor, and a gyro sensor.

The modification of the first embodiment is also applicable to the modifications of embodiments other than the first embodiment.

Second Embodiment

A second embodiment will be described below. In the second embodiment, a specific sound detection unit included in headphones HB uses a learned model of the data set of headphones HA. Since the detection accuracy of a voice of the wearer of the headphones decreases, audio data picked up through the microphones of the headphones HB is converted into the transfer characteristics of the headphones HA in the preceding stage of the specific sound detection unit.

Figure 6:
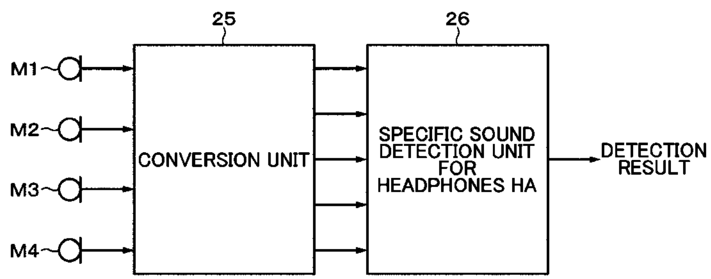
FIG. 6 is an explanatory drawing of a second embodiment.

FIG. 6 is a block diagram illustrating the configuration of the headphones HB. FIG. 6 illustrates only a part of the configuration. The illustration of a signal processing unit or the like is omitted as appropriate.

The headphones HB include microphones MB1 to MB4, a conversion unit 25, and a specific sound detection unit 26. The conversion unit 25 has the same function as the conversion unit 212. Specifically, the conversion unit 25 performs inverse convolution on audio data, which is picked up through each of the microphones, by an impulse response corresponding to the microphone and then performs convolution on the audio data by an impulse response of the microphone of the headphones HA constituting the same channel. The specific sound detection unit 26 detects a voice of the wearer of the headphones HB by using a learned model to be used in the specific sound detection unit of the headphones HA.

The conversion by the conversion unit 25 generates audio data corresponding to the transfer characteristics of the headphones HA. In order to improve the accuracy of detection by the specific sound detection unit 26 of the subsequent stage, audio data is preferably generated according to the number of microphones of the headphones HA. For example, audio data corresponding to a microphone MA5 may be generated by conversion on audio data picked up through the microphone MB3 or the microphone MB4 near the position of the microphone MA5.

The specific sound detection unit 26 detects a specific sound from audio data corresponding to the transfer characteristics of the headphones HA, the audio data being generated through conversion by the conversion unit 25. Since the specific sound detection unit 26 uses the learned model to be used in the specific sound detection unit of the headphones HA, the accuracy of detection does not decrease.

The present embodiment eliminates the need for changing the learned model to be used in the specific sound detection unit. Thus, it is not necessary to acquire a large amount of learning data for constructing a new learned model.

Third Embodiment

Figure 7:
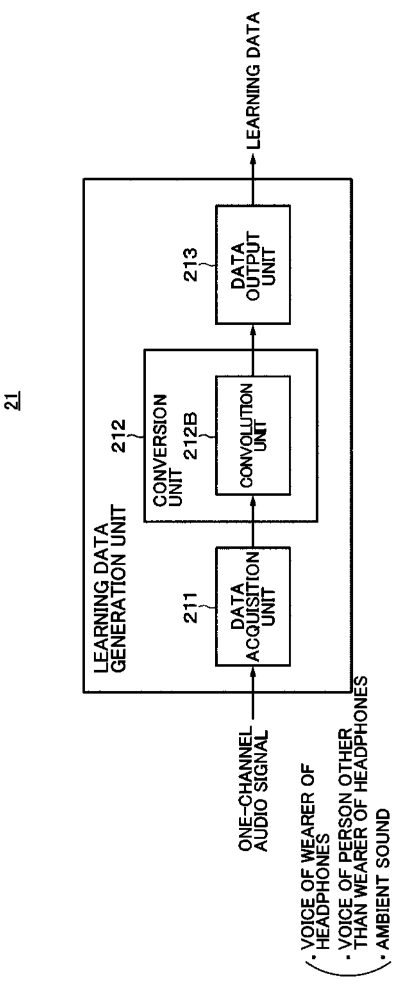
FIG. 7 is an explanatory drawing of a third embodiment.

A third embodiment will be described below. In the third embodiment, the data set of headphones HB is generated without using the data set of headphones HA. As illustrated in FIG. 7, a conversion unit 212 according to the present embodiment includes only a convolution unit 212B without an inverse convolution unit 212A.

As in the method described in the first embodiment, the present embodiment acquires an impulse response of each microphone corresponding to a voice of the wearer of the headphones, an impulse response of each microphone corresponding to a voice of a person other than the wearer of the headphones, and an impulse response of each microphone corresponding to an ambient sound. Thereafter, the following processing is performed.

To the conversion unit 212 via a data acquisition unit 211, a large amount of prepared one-channel audio data (audio data corresponding to a voice of the wearer of the headphones) is input. The impulse response of the headphones HB (the impulse response of each microphone corresponding to a voice of the wearer of the headphones) is convoluted into each piece of the large amount of one-channel audio data.

To the conversion unit 212 via the data acquisition unit 211, a large amount of prepared one-channel audio data (audio data corresponding to a voice of a person other than the wearer of the headphones) is input. The impulse response of the headphones HB (the impulse response of each microphone corresponding to a voice of a person other than the wearer of the headphones) is convoluted into each piece of the large amount of one-channel audio data.

To the conversion unit 212 via the data acquisition unit 211, a large amount of prepared one-channel audio data (audio data corresponding to an ambient sound) is input. The impulse response of the headphones HB (the impulse response of each microphone corresponding to an ambient sound) is convoluted into each piece of the large amount of one-channel audio data.

Through the processing, the data set of the headphones HB can be acquired. Since audio data for general purpose use can be used as one-channel audio data, a learned model can be generated at lower cost.

Fourth Embodiment

A fourth embodiment will be described below. The conversion described in the first to third embodiments is also applicable when the conditions of a sounding body (e.g., the wearer of headphones) are changed. For example, the conversion is also applicable when the wearer of the headphones wears a mask in the detection of a voice of the wearer of the headphones. The following provides a specific description.

According to whether the wearer of the headphones wears a mask or not, acquired audio data on a voice of the wearer of the headphones through a plurality of microphones differs as follows:

When the wearer wears a mask, audio data has a smaller amplitude than that when the wearer does not wear a mask. Signal components of high frequencies, in particular, have small amplitudes.

This is because a mask interferes with the propagation of a voice of the wearer of the headphones to the microphones through air vibrations and signal components of higher frequencies are more susceptible to the interference and are more likely to attenuate.

Thus, if a detector is generated by machine learning with a data set of voices of the wearer of the headphones without a mask, a voice of the wearer of the headphones with a mask may be undetectable. This is because the characteristics of audio data during learning are different from those during detection. In order to suppress a reduction in detection performance, a data set of voices of the wearer of the headphones with a mask needs to be additionally acquired to generate a detector by machine learning. An additional data set can be acquired using the foregoing technique.

Specifically, in the acquisition of an impulse response by using a dummy head having speakers, a mask is put on the dummy head having the speakers. In this state, a TSP signal is reproduced and an impulse response is acquired. This can acquire an impulse response including influence on audio data acquired through the microphones with a mask. The impulse response is convoluted into audio data on a data set of voices of the wearer of the headphones without a mask, thereby acquiring the same data set as that of the data set of voices of the wearer of the headphones with a mask. In this way, the use of the foregoing conversion technique can acquire an additional data set even when the wearer of the headphones wears a mask.

Fifth Embodiment

A fifth embodiment will be described below. In the foregoing embodiments, a data set was simply described as a set of audio data for convenience of explanation. The format of a data set according to the present embodiment has a hierarchical data structure including metadata associated with predetermined data (for example, one of audio data, image data, and text data). According to the format, the data set can be also used for detecting sounds other than a voice of the wearer of the headphones or can be shared in the development of other audio techniques (including voice recognition and a noise reduction technique) as well as detection through a plurality of microphones attached to the headphones.

Table 1 indicates a format example of the data sets.

TABLE 1

| Index | File information | Sound-source type information 1 | Sound-source type information 2 | Sound-source type information 3 | Coordinate system information | Microphone position information | Sound source position information |
|---|---|---|---|---|---|---|---|
| A1 | hpA_headphone_user_voice_00000.wav | Voice of | Japanese | Male | Three- | mic_pos[0] = (90, 0, 0.1) | (0, −80, 0.05) |
| A2 | hpA_headphone_user_voice_00001.wav | wearer of | | Female | dimensional | mic_pos[1] = (90, 10, 0.1) | (0, −80, 0.05) |
| A3 | hpA_headphone_user_voice_00002.wav | headphones | English | Male | polar | mic_pos[2] = (80, 0, 0.1) | (0, −80, 0.05) |
| A4 | hpA_others_voice_front_00000.wav | Voice of | Japanese | Male | coordinate | mic_pos[3] = (110, 0, 0.1) | (0, 0, 1) |
| A5 | hpA_others_voice_left_00000.wav | person other | | Female | system with | mic_pos[4] = (90, 10, 0.1) | (90, 0, 1) |
| A6 | hpA_others_voice_back_00000.wav | than wearer | English | Male | origin | | (180, 0, 1) |
| A7 | hpA_others_voice_right_00000.wav | of headphones | | Female | located | | (90, 0, 1) |
| A8 | hpA_env_00000.wav | Ambient | Outdoors | Residential | at center | | None |
| A9 | hpA_env_00001.wav | sound | | street | of head of | | |
| | | | | Station | wearer of | | |
| A10 | hpA_env_00002.wav | | Indoors | Living room | headphones | | |
| A11 | hpA_env_00003.wav | | | Office | | | |
| A12 | hpA_env_00004.wav | | | Hall | | | |
| | . | | | | | . | |
| | . | | | | | . | |
| | . | | | | | . | |

TABLE 1-continued

| Index | File information | Sound-source type information 1 | Sound-source type information 2 | Sound-source type information 3 | Coordinate system information | Microphone position information | Sound source position information |
|---|---|---|---|---|---|---|---|
| A100 | hpB_headphone_B_user_voice_00000.wav | Voice of wearer of headphones | Japanese | Male | | mic_pos[0] = (90, 20, 0.1) | (0, 80, 0.05) |
| A101 | hpB_headphone_B_user_voice_00001.wav | | | Female | | mic_pos[1] = (90, 20, 0.1) | (0, 80, 0.05) |
| A102 | hpB_headphone_B_user_voice_00002.wav | | English | Female | | mic_pos[2] = (80, 5, 0.1) | (0, 80, 0.05) |
| A103 | hpB others voice front 00000.wav | Voice of person other than wearer of headphones | Japanese | Male | | mic_pos[3] = (110, 5, 0.1) | (0, 0, 1) |

In the format example in Table 1, sound-source type information 1 to 3, coordinate system information, microphone position information, and sound-source position information, which indicate the attributes of an audio file, are held as metadata while being associated with one another for each audio file (e.g., .wav files) listed in a row of file information. The file information is assigned with indexes A1, A2, and A3 and the like.

In the format example in Table 1, indexes A1 to A12 indicate the data set of headphones HA and indexes A100 to A103 and audio files indicate the data set of headphones HB. Information held in each column will be described below.

"Index"

An identifier for identifying data constituting the data set.

"File Information"

Audio data and the file name of the audio data (e.g., .wav file) are held. The listed audio file holds audio data on the number and order of channels corresponding to the number and order of microphones at the positions of mic_pos[*] in "microphone position information".

"Sound-Source Type Information 1"

Type information on a sound source is held. In this case, as sound-source type information 1, one of "a voice of the wearer of the headphones", "a voice of a person other than the wearer of the headphones", and "ambient sounds" is held.

"Sound-Source Type Information 2"

As the sound-source type information 2, sound-source type information different from the sound-source type information 1 is held. In this case, if the sound-source type information 1 is "a voice of the wearer of the headphones" or "a voice of a person other than the wearer of the headphones", "Japanese" or "English" is held as the sound-source type information 2. If the sound-source type information 1 is "ambient sound", "outdoors" or "indoors" is held as the sound-source type information 2.

Sound-Source Type Information 3

As the sound-source type information 3, sound-source type information different from the sound-source type information 1 and the sound-source type information 2 is held. In this case, if the sound-source type information 2 is "Japanese" or "English", "male" or "female" is held as the sound-source type information 3. If the sound-source type information 2 is "outdoors" or "outdoors", the specific contents of "outdoors" or "indoors" are held as the sound-source type information 3. For example, if the sound-source type information 2 is "outdoors", "residential street" or "station" is held as the sound-source type information 3. For example, if the sound-source type information 2 is "indoors", "living room", "office", or "hall" is held as the sound-source type information 3.

"Coordinate System Information"

Figure 8:
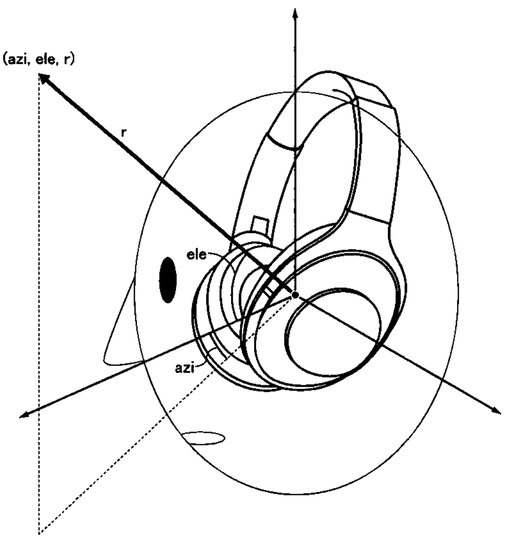
FIG. 8 is a reference diagram for explaining a fifth embodiment.

Information is held about the definition of the coordinate system of position information (e.g., (90, 10, 0.1)) held in "microphone position information" and "sound-source position information column". In the example of Table 1, "a three-dimensional polar coordinate system with the origin located at the center of the head of the wearer of headphones" is held as "coordinate system information". As indicated in FIG. 8, the three-dimensional polar coordinate system can be determined with a horizontal angle azi, a vertical angle ele, and a distance r(m) from the origin located at the center of the head of the wearer of the headphones. The horizontal angle azi has a positive value on the left side and has a negative value on the right side with respect to the wearer of the headphones and ranges from −180° to 180°. The vertical angle ele has a positive value on the upper side and has a negative value on the lower side with respect to the wearer of the headphones and ranges from −90° to 90°.

"Microphone Position Information"

Information on the positions of the microphones is held in a coordinate system determined by "coordinate system information". For example, in the case of the data set of the headphones HA, the coordinates of the positions of the microphones, that is, mic_pos[0] to mic_pos[4] are held as many as the number of microphones. The number of microphones is five. Correspondences between mic_pos[*] and the microphones of the headphones HA are:

mic_pos[0]—microphone MA1, mic_pos[1]—microphone MA2, mic_pos[2]—microphone MA3, mic_pos[3]—microphone MA4, and mic_pos[4]—microphone MA5.

Sound Source Position Information

Information on the position of a sound source is held in a coordinate system determined by "coordinate system information". The indexes A1 to A3 are data sets of voices of the wearer of the headphones. Sound source position information ((0, −80, 0.05) in table 1) corresponding to the indexes is associated with the sound source of the wearer of the headphones, that is, the mouth position of the wearer of the headphones.

The format example of the data sets acquired through the microphones was described. The impulse responses acquired through the microphones may be handled as data sets. Table 2 indicates a format example of the data sets of the impulse responses.

TABLE 2

| Index | File information | Speaker information | Coordinate system information | Microphone position information | Speaker position information |
|---|---|---|---|---|---|
| B1 | hpA_impulse_response_0_−80_0.05.wav | Dummy head A | Three-dimensional polar | mic_pos[0] = (−90, 0, 0.1) | (0, −80, 0.05) |
| B2 | hpA_impulse_response_0_0_1.wav | having speakers | coordinate system with | mic_pos[1] = (90, 10, 0.1) | (0, 0, 1) |
| B3 | hpA_impulse_response_90_0_1.wav | | origin located at | mic_pos[2] = (80, 0, 0.1) | (90, 0, 1) |
| B4 | hpA_impulse_response_180_0_1.wav | | center of head of wearer | mic_pos[3] = (110, 0, 0.1) | (180, 0, 1) |
| B5 | hpA_impulse_response_−90_0_1.wav | | of headphones | mic_pos[4] = (90, −10, 0.1) | (−90, 0, 1) |
| B6 | hpA_impulse_response_−90_0_1.1.wav | Speakers A | | | (−90, 0, 1.1) |
| B7 | hpA impulse response 90 10 1.1.wav | | | | (90. 10, 1.1) |
| B8 | hpA_impulse_response_80_0_1.1.wav | | | | (80, 0, 1.1) |
| B9 | hpA_impulse_response_110_0_1.1.wav | | | | (110, 0, 1.1) |
| B10 | hpA_impulse_response_90_−10_1.1.wav | | | | (90, −10, 1.1) |
| B11 | hpB_impulse_response_0_−80_0.05.wav | Dummy head B | | mic_pos[0] = (−90, 20, 0.1) | (0, −80, 0.05) |
| B12 | hpB_impulse_response_0_0_1.wav | having speakers | | mic_pos[1] = (90, 20, 0.1) | (0, 0, 1) |
| B13 | hpB_impulse_response_90_0_1.wav | | | mic_pos[2] = (80, −5, 0.1) | (90, 0, 1) |
| B14 | hpB_impulse_response_180_0_1.wav | | | mic_pos[3] = (110, −5, 0.1) | (180, 0, 1) |
| B15 | hpB_impulse_response_−90_0_1.wav | | | | (−90, 0, 1) |
| B16 | hpB_impulse_response_−90_20_1.1.wav | Speakers B | | | (−90, 20, 1.1) |
| B17 | hpB_impulse_response_90_20_1.1.wav | | | | (90, 20, 1.1) |
| B18 | hpB_impulse_response_80_−5_1.1.wav | | | | (80, −5, 1.1) |
| B19 | hpB_impulse_response_110_−5_1.1.wav | | | | (110, −5, 1.1) |
| | | | . . . | | |

As indicated in table 2, indexes (e.g., indexes B1, B2, . . . ) are also assigned to the impulse responses constituting the data set of the impulse responses. The impulse responses as the data sets achieve a configuration for acquiring predetermined impulse responses from a cloud computer or the like. In the example of table 2, impulse responses assigned with indexes B1 to B10 indicate the data set of impulse responses acquired by the headphones HA, and impulse responses assigned with indexes B11 to B19 indicate the data set of impulse responses acquired by the headphones HB.

Since the contents of "coordinate system information" and "microphone position information" in table 2 are the same information as that of table 1, overlapping explanations thereof are omitted and other attributes will be described.

Index

An identifier for identifying impulse responses.

"File Information"

Audio data corresponding to the impulse response and the file name of the audio data (e.g., .wav file) are held. The listed audio file holds the impulse responses of the number and order of channels corresponding to the number and order of microphones at the positions of mic_pos[*] in "microphone position information".

"Speaker Information"

When an impulse response is acquired, information on the speaker having reproduced the TSP signal is held. When an impulse response is acquired by reproducing the TSP signal with a dummy head having speakers with a mask as described in the fourth embodiment, for example, "dummy head having speakers (masked)" may be described as "speaker information".

"Speaker Position Information"

In a coordinate system described in "coordinate system information", position information on the speaker having reproduced the TSP signal in the acquisition of the impulse response is held.

The above-mentioned data sets are applicable to the foregoing embodiments. For example, in the learning data generation unit 21 in FIG. 5, the data acquisition unit 211 receives "audio data corresponding to file information", "sound-source type information 1", "sound-source type information 2", "sound-source type information 3", "coordinate system information", and "microphone position information" that correspond to the indexes A1 to A12 in table 1. "Sound source position information" is input only when "sound-source type information 1" is "a voice of a person other than the wearer of the headphones".

The inverse convolution unit 212A receives "audio data on an impulse response corresponding to file information", "speaker information", "coordinate system information", "microphone position information", and "speaker position information" that correspond to the indexes B1 to B10 in table 2.

The convolution unit 212B receives "audio data on an impulse response corresponding to file information", "speaker information", "coordinate system information", "microphone position information", and "speaker position information" that correspond to the indexes B11 to B19 in table 2.

The conversion unit 25 in FIG. 6 receives audio data picked up through the microphones of the headphones HB in real time. Furthermore, the conversion unit 25 receives audio data or the like corresponding to the impulse responses in table 2.

If the learning data generation unit 21 is configured as illustrated in FIG. 7, the data acquisition unit 211 acquires a large amount of prepared one-channel audio data. For example, in table 1, an input is audio data of one of the five channels of audio data corresponding to "file information" assigned with the indexes A1 to A12. "Sound-source type information 1" or the like may be input.

In the configuration of FIG. 7, the impulse response of the headphones HA is not necessary. Thus, the convolution unit 212B receives "audio data on an impulse response corresponding to file information", "speaker information", "coordinate system information", "microphone position information", and "speaker position information" that correspond to the indexes B11 to B19 in table 2.

The impulse response data set in table 2 may be held in a cloud device as in the format of table 2 and downloaded into the conversion unit. Thus, information provided for conversion without being loaded at the shipment of the product (for example, an impulse response acquired with a dummy head having speakers with a mask in the fourth embodiment) can be used after the shipment of the product, allowing an adjustment to the detection performance after the shipment of the product.

Sixth Embodiment

A sixth embodiment will be described below. The present embodiment has a hierarchical data structure including metadata as in the fifth embodiment, allowing an information processor (various electronic devices) to autonomously select learning data for generating a learned model.

First Example

Figure 9A:
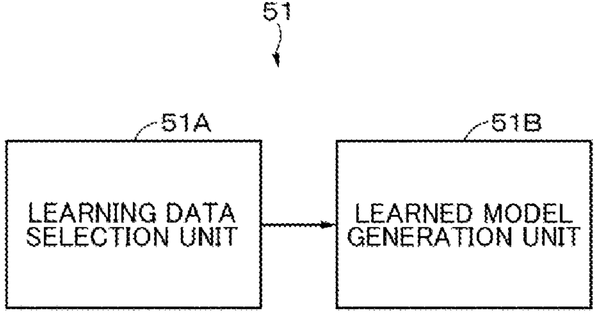
FIGS. 9A, 9B, and 9C are explanatory drawings of a sixth embodiment.

FIG. 9A is a block diagram illustrating a configuration example of a learning device (learning device 51) according to a first example of the present embodiment. The learning device 51 includes a learning data selection unit 51A and a learned model generation unit 51B. The learning data selection unit 51A holds data indicated in table 1 and table 2 and selects learning data suitable for a learned model generated by the learned model generation unit 51B.

For example, it is assumed that the learned model generation unit 51B generates a learned model for detecting a voice of the wearer of the headphones as described in the first and second embodiments. In this case, the learning data selection unit 51A selects, as learning data, the data sets assigned with the indexes A1 to A103 in table 1.

As another example, it is assumed that the learned model generation unit 51B generates a learned model for detecting a voice of the wearer of the headphones indoors. The use of the learned model enables the detection of, for example, a voice of a user who views a television or a personal computer with headphones and allows the voice to be used as a detected command or an evaluation of a program. In other words, the learned model enables interactive communications between a television or a personal computer and the wearer of the headphones.

In this case, the learning data selection unit 51A selects, as learning data, the data set other than data describing "outdoors" as "sound-source type information 2" from data listed in table 1.

Likewise, if the learned model generation unit 51B generates, for example, a learned model for Japanese headphones, the learning data selection unit 51A selects, as learning data, the data set other than data describing "English" as "sound-source type information 2". For example, if the learned model generation unit 51B generates a learned model for Americans televisions, the learning data selection unit 51A selects, as learning data, the data set other than data describing "Japanese" and "outdoors" as "sound-source type information 2".

The learning device 51 may include the learning data generation unit 21, which is not illustrated, and perform the same processing as in the first embodiment and other embodiments.

Second Example

Figure 9B:
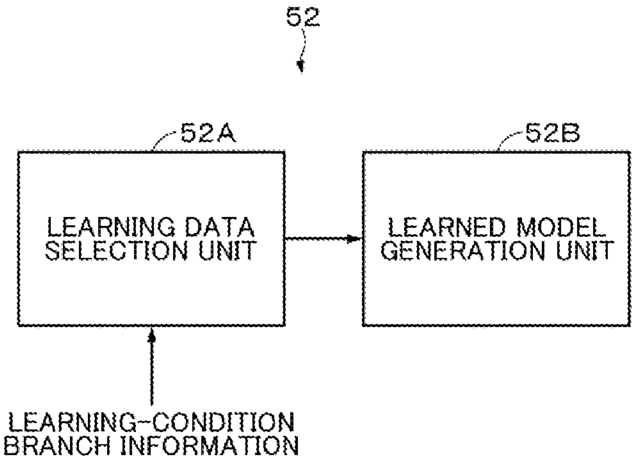

FIG. 9B illustrates a configuration example of a learning device (learning device 52) according to a second example of the present embodiment. The learning device according to the present example has the same configuration as the learning device 51 of the first example. The present example is different from the first example in that learning-condition branch information is input to a learning data selection unit 52A of the learning device 52.

The learning-condition branch information is information indicating learning data to be used when a learned model is generated. Table 3 indicates an example of the learning-condition branch information.

TABLE 3

| Learning-condition branch information ID | Learning-condition branch information |
|---|---|
| C1 | Indexes A1 to A103 |
| C2 | Indexes A1 to A103 and indoors |
| C3 | Impulse indexes B1 to B10 and Impulse indexes B11 to B19 |
| | . . . |

As indicated in table 3, information described as the learning-condition branch information indicates learning data to be used when a learned model is generated. In order to identify the learning-condition branch information, the learning-condition branch information is assigned with learning-condition branch information IDs.

For example, the learning-condition branch information assigned with C1 as a learning-condition branch information ID indicates that the data set of the indexes A1 to A103 in table 1 is used as learning data. The learning-condition branch information assigned with C2 as a learning-condition branch information ID indicates that the data set of the indexes A1 to A103 with "indoors" held as "sound-source type information 2" in table 1 is used as learning data. The learning-condition branch information assigned with C3 as a learning-condition branch information ID indicates that the data sets of the indexes B1 to B10 and the indexes B11 to B19 in table 2 is used as learning data. Indexes described as impulse indexes in table 3 mean indexes allocated to impulse responses (indexes starting with B in the present example).

The learning data selection unit 52A selects, as learning data, the data set including metadata matching the input learning-condition branch information. If the data sets of table 1 and table 3 are stored in the learning data selection unit 52A, only the learning-condition branch information ID may be input to the learning data selection unit 52A. The learning data selection unit 52A may select, as learning data, learning-condition branch information corresponding to the learning-condition branch information ID. Alternatively, the learning data selection unit 52A may acquire learning data corresponding to the learning-condition branch information ID, from a cloud device or the like via a network. The learning-condition branch information ID may be input by a manual operation from the outside, may be automatically input, or may be stored as a program in advance. For example, the learning data selection unit 52A autonomously selects learning data and performs learning according to the learning-condition branch information ID when performing processing in a learning mode. Learning data corresponding to the learning-condition branch information ID can be updated.

Third Example

Figure 9C:
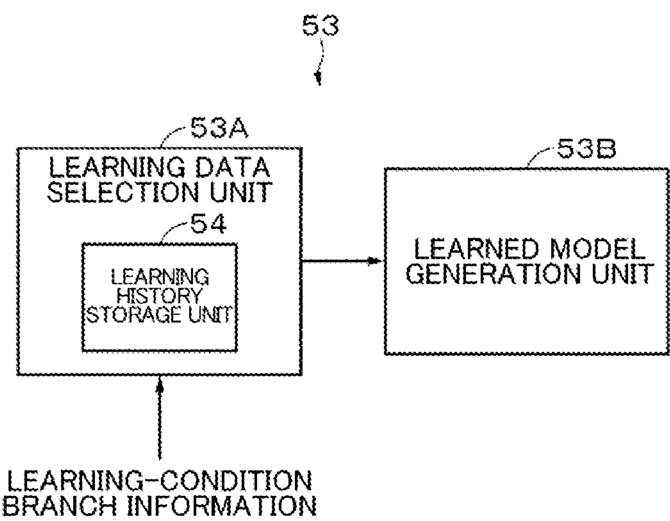

FIG. 9C illustrates a configuration example of a learning device (learning device 53) according to a third example.

The learning device 53 includes a learning data selection unit 53A and a learned model generation unit 53B as in the second example. In the present example, the learning data selection unit 53A includes a learning history storage unit 54.

The learning history storage unit 54 stores learning-condition branch information, in other words, stores the history of learning data used for generating a learned model. For example, learning data used for generating a learned model is stored by using the learning-condition branch information ID in table 3.

The storage of the history of learning data used for generating past learned models is advantageous as follows:

Since the history of learning data used for generating a learned model is stored, learning data to be added to generate another learned model can be efficiently determined, for example, during an update of the product. This can efficiently generate another learned model, for example, during an update of the product. In some cases, data used as learning data is restricted by laws and regulations in the medical field and the like. Since the history of learning data used for generating a learned model is stored, data to be added as learning data can be efficiently determined when such restrictions are lifted.

The history of learning data used for generating a learned model can be updated. Furthermore, a learned model using learning data before an update and a learned model using learning data after an update can be compared with each other, enabling a comparison of, for example, the accuracy of detection using the learned models. This can learn learning data to be used for improving, for example, the accuracy of detection using the learned models.

Seventh Embodiment

A seventh embodiment will be described below. In the present embodiment, a data set in table 1 is generated by a device different from headphones, for example, a server device.

Figure 10:
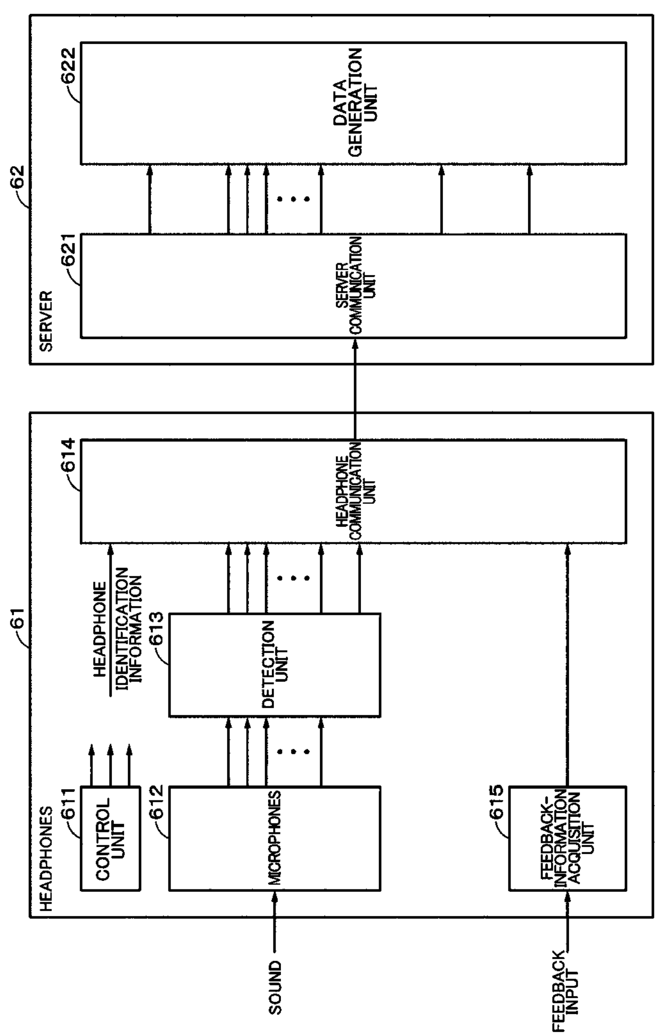
FIG. 10 is an explanatory drawing of a seventh embodiment.

FIG. 10 is a block diagram illustrating a configuration example of an information processing system (information processing system 60) according to the seventh embodiment. The information processing system 60 includes headphones 61 and a server 62. The headphones 61 include a control unit 611, a plurality of microphones 612, a detection unit 613, a headphone communication unit 614, and a feedback-information acquisition unit 615. The server 62 includes a server communication unit 621 and a data generation unit 622.

The control unit 611 is configured with, for example, a CPU and performs control over the units of the headphones. The microphones 612 pick up sound around the headphones. Audio data corresponding to a sound picked up through the microphones 612 is digitized by an AD (Analog to Digital) converter (not illustrated), and then the digitized audio data is output to the detection unit 613.

The detection unit 613 calculates whether the audio data includes a voice of the wearer of the headphones and the probability of the audio data including a voice of the wearer of the headphones according to a known method. If the calculated probability is equal to or higher than a predetermined threshold value (e.g., 80%), the detection unit 613 determines that a voice has been "detected". If the probability is lower than the threshold value, the detection unit 613 determines that a voice has been "undetected". The detection unit 613 outputs the determination result to the control unit 611 and the headphone communication unit 614. The headphone communication unit 614 communicates with the server communication unit 621. The feedback-information acquisition unit 615 generates and acquires feedback information based on a feedback input. The feedback input is a feedback input from the wearer of the headphones. Feedback is input by an operation of the wearer of the headphones (e.g., a button input or an input to a touch panel) or is automatically input by a sensor attached to the wearer of the headphones (e.g., a sensor for imaging a mouth or a biological sensor). The feedback-information acquisition unit 615 outputs the feedback information to the headphone communication unit 614.

The server communication unit 621 in the server 62 communicates with the headphone communication unit 614. The server communication unit 621 then outputs data acquired from the headphones 61 through communications, to the data generation unit 622. The data generation unit 622 generates the data sets listed in table 1, on the basis of the data supplied from the server communication unit 621.

A specific example of processing performed by the information processing system 60 will be described below. If the detection result of the detection unit 613 is "detected", the control unit 611 of the headphones 61 stops the reproduction of audio data in the headphones 61. If the detection result of the detection unit 613 is "undetected", the control unit 611 does not stop the reproduction of audio data in the headphones 61.

When the reproduction of audio data is stopped, the wearer of the headphones performs a predetermined operation, thereby providing a feedback input that indicates whether the stop of reproduction of audio data is appropriate or not. The feedback input is acquired by the feedback-information acquisition unit 615. The feedback-information acquisition unit 615 generates feedback information based on the feedback input. The feedback information is transmitted to the server communication unit 621 through the headphone communication unit 614. For example, when control is performed to stop the reproduction of audio data even if no voice is heard from the wearer of the headphones, a feedback input of "wrong" is provided from the wearer of the headphones. Otherwise a feedback input of "correct" is provided.

The headphone communication unit 614 converts headphone identification information (e.g., the model name of the headphones) recorded in the headphones 61, the audio data and the detection result from the detection unit 613, and the feedback information from the feedback-information acquisition unit 615 into a data stream and transmits the data stream to the server 62.

The server communication unit 621 converts the data stream transmitted from the headphones 61, acquires the headphone identification information, the audio data, the detection result, and the feedback information and outputs the information and data to the data generation unit 622.

For example, the data generation unit 622 acquires information on the format example of data sets in table 1 and generates a data set as follows: The data generation unit 622 refers to the headphone identification information to acquire coordinate system information, microphone position information, and sound-source position information that are held in the server 62 for each item of the headphone identification information and stores the information as a data set. Moreover, the data generation unit 622 stores audio data as a data set.

Furthermore, the data generation unit 622 determines sound-source type information (e.g., sound-source type information 1) on the basis of the detection result and feedback information on the wearer of the headphones and stores the information as a data set. In this case, the feedback information is information indicating whether the output of a voice of the wearer of the headphones from the detection unit 613 is correct or not.

- If the detection result is "detected" and the feedback information is "correct", the data generation unit 622 determines that the voice is "a voice of the wearer of the headphones" and describes "a voice of the wearer of the headphones" in "sound-source type information 1".
- If the detection result is "detected" and the feedback information is "wrong", the data generation unit 622 determines that the voice is "a voice of a person other than the wearer of the headphones" and describes "a voice of a person other than the wearer of the headphones" in "sound-source type information 1".
- If the detection result is "undetected" and the feedback information is "correct", the data generation unit 622 determines that the voice is "a voice of a person other than the wearer of the headphones" and describes "a voice of a person other than the wearer of the headphones" in "sound-source type information 1".
- If the detection result is "undetected" and the feedback information is "wrong", the data generation unit 622 determines that the voice is "a voice of the wearer of the headphones" and describes "a voice of the wearer of the headphones" in "sound-source type information 1".

For other sound-source type information, for example, audio data may be subjected to frequency analysis to identify "male" or "female", so that the identification result is described in the sound-source type information. Moreover, outdoors or indoors may be identified on the basis of a noise component included in audio data, and the identification result may be described in sound-source type information.

According to the present embodiment, a data set can be automatically generated and the data set can be generated at lower cost.

Modification

While a plurality of embodiments of the present disclosure have been specifically described, it is to be understood that the contents of the present disclosure are not limited to the embodiments and that various modifications can be made based on the technical ideas of the present disclosure.

In the foregoing embodiments, audio data was mainly described as an example. The present disclosure is also applicable to image data and text data. For example, it is assumed that a predetermined learned model is generated by using imaging data obtained by a new-type imaging device. In this case, it takes time and effort to obtain a large amount of imaging data through imaging by a new-type imaging device. However, the present disclosure is applied to conversion using imaging data obtained by an old-type imaging device, thereby generating learning data usable for the learning of a new-type imaging device.

Specifically, the characteristic corresponding to the first condition in the foregoing embodiment may be a characteristic corresponding to a first image sensor, and the characteristic corresponding to the second condition may be a characteristic corresponding to a second image sensor different from the first image sensor. In this case, the characteristic corresponding to the first image sensor may include at least one of the size and the number of pixels of the first image sensor, and the characteristic corresponding to the second image sensor may include at least one of the size and the number of pixels of the second image sensor. The first condition and the second condition may be different imaging conditions (e.g., a set value of the imaging device, an imaging mode, an angle of view, a location of imaging, a luminance, and a color). The first condition and the second condition in the case of text data may be dictionaries (language difference). In the case of text data, the present disclosure is also applicable to a corpus.

The function in the foregoing embodiment can be implemented as a single device having the function (a local device or a cloud device). One or more of the forms of the variations may be selected as desired and combined as appropriate. The configurations, methods, processes, shapes, materials, and numerical values or the like of the foregoing embodiments and modification can be combined with each other without departing from the gist of the present disclosure.

The present disclosure can also be configured as follows;

(1)

A learning data generating device configured to generate learning data used for learning of a machine learning model, the device including: a data acquisition unit that acquires input data; and a conversion unit that converts the input data into learning data by performing processing on the input data on the basis of a characteristic difference between a characteristic corresponding to a first condition and a characteristic corresponding to a second condition different from the first condition.

(2)

The learning data generating device according to (1), wherein the input data and the learning data are audio data.

(3)

The learning data generating device according to (2), wherein the characteristic corresponding to the first condition is a first transfer characteristic corresponding to the layout of a first sensor, and the characteristic corresponding to the second condition is a second transfer characteristic corresponding to the layout of a second sensor.

(4)

The learning data generating device according to (3), wherein the first sensor and the second sensor are microphones.

(5)

The learning data generating device according to (4), wherein the transfer characteristics include at least one of an amplitude characteristic, a time characteristic, the directional characteristics of the microphones, and the frequency characteristics of the microphones.

(6)

The learning data generating device according to any one of (1) to (5), wherein the machine learning model is a machine learning model that detects a voice of the wearer of an acoustic treatment device.

(7)

The learning data generating device according to (1), wherein the input data and the learning data are image data, the characteristic corresponding to the first condition is a characteristic corresponding to a first image sensor, and the characteristic corresponding to the second condition is a characteristic corresponding to a second image sensor different from the first image sensor.

(8)

The learning data generating device according to (7), wherein the characteristic corresponding to the first image sensor includes at least one of the size and the number of pixels of the first image sensor, and the characteristic corresponding to the second image sensor includes at least one of the size and the number of pixels of the second image sensor.

(9)

The learning data generating device according to (7) or (8), wherein the first condition and the second condition are different imaging conditions.

(10)

A learning data generating method that generates learning data used for learning of a machine learning model, the method including:

causing a data acquisition unit to acquire input data; and causing a conversion unit to convert the input data into learning data by performing processing on the input data on the basis of a characteristic difference between a characteristic corresponding to a first condition and a characteristic corresponding to a second condition different from the first condition.

(11)

A learning device including: a learning data selection unit that selects, from a plurality of data sets, learning data used for learning of a machine learning model; and a machine-learning-model generation unit that generates the machine learning model by using the selected learning data, wherein the data set includes predetermined data and metadata associated with the predetermined data, and the learning data selection unit selects the learning data with reference to the metadata.

(12)

The learning device according to (11), wherein learning-condition branch information is input to the learning data selection unit, and for the learning data selection unit, the data set including the metadata matching the learning-condition branch information is selected as the learning data.

(13)

The learning device according to (12), wherein learning-condition branch information is stored.

(14)

A learning method including: causing a learning data selection unit to select, from a plurality of data sets, learning data used for learning of a machine learning model; and causing a machine-learning-model generation unit to generate the machine learning model by using the selected learning data, wherein the data set includes predetermined data and metadata associated with the predetermined data, and the learning data selection unit selects the learning data with reference to the metadata.

(15)

A data structure used for a learning data selecting device that selects, from a plurality of pieces of data, learning data used for learning of a machine learning model, the data structure including: predetermined data that is one of audio data, image data, and text data, and metadata associated with the predetermined data, wherein the learning data selecting device is used for processing for selecting, as the learning data, the predetermined data corresponding to the metadata matching learning-condition branch information.

(16)

An information processor including a machine learning model learned by using learning data generated by the learning data generating device according to any one of (1) to (9).

(17)

An acoustic treatment device including: a specific sound detection unit that detects a specific sound on the basis of a machine learning model learned by using learning data generated by the learning data generating device according to any one of (1) to (9); and a processing unit that performs predetermined processing when the specific sound is detected.

(18)

The acoustic treatment device according to (17), wherein the specific sound is a voice of the wearer of the acoustic treatment device.

REFERENCE SIGNS LIST

1 Headphones
15 Specific sound detection unit
20,51,52,53 Learning device
21 Learning data generation unit
22 Learned model generation unit
211 Data acquisition unit
212 Conversion unit
51A, 52A, 53A Learning data selection unit
54 Learning history storage unit
M1 to M5, MA1 to MA5, MB1 to MB4 Microphone

The invention claimed is:

1. A learning data generating device, comprising:

a data acquisition unit configured to acquire input data from a plurality of sensors; and a conversion unit configured to:

process the input data based on characteristic difference between a first transfer characteristic and a second transfer characteristic, wherein the first transfer characteristic corresponds to a layout of a first sensor of the plurality of sensors, and the second transfer characteristic corresponds to a layout of a second sensor of the plurality of sensors; and convert the input data into learning data based on the processed input data, wherein the learning data is for learning of a machine learning model.

2. The learning data generating device according to claim 1, wherein the input data and the learning data are audio data.

3. The learning data generating device according to claim 2, wherein each of the first sensor and the second sensor is a microphone.

4. The learning data generating device according to claim 3, wherein the first transfer characteristic and the second transfer characteristic include at least one of an amplitude characteristic of the microphone, time characteristic of the microphone, directional characteristic of the microphone, or frequency characteristic of the microphone.

5. The learning data generating device according to claim 1, wherein the machine learning model is configured to detect a voice of a wearer of an acoustic treatment device.

6. A learning data generating method, comprising:

acquiring input data from a plurality of sensors;

processing the input data based on a characteristic difference between a first transfer characteristic and a second transfer characteristic, wherein the first transfer characteristic corresponds to a layout of a first sensor of the plurality of sensors, and the second transfer characteristic corresponds to a layout of a second sensor of the plurality of sensors; and converting the input data into learning data based on the processing of the input data, wherein the learning data is for learning of a machine learning model.

7. An information processor, comprising:

a learning data generating device that comprises:

a data acquisition unit configured to acquire input data from a plurality of sensors; and a conversion unit configured to:

process the input data based on a characteristic difference between a first transfer characteristic and a second transfer characteristic, wherein the first transfer characteristic corresponds to a layout of a first sensor of the plurality of sensors, and the second transfer characteristic corresponds to a layout of a second sensor of the plurality of sensors; and convert the input data into learning data based on the processed input data, wherein the learning data is for learning of a machine learning model.

8. An acoustic treatment device, comprising:

a plurality of sensors;

a learning data generating device that comprises:

a data acquisition unit configured to acquire input data from the plurality of sensors; and a conversion unit configured to:

process the input data based on a characteristic difference between a first transfer characteristic and a second transfer characteristic, wherein the first transfer characteristic corresponds to a layout of a first sensor of the plurality of sensors, and the second transfer characteristic corresponds to a layout of a second sensor of the plurality of sensors; and convert the input data into learning data based on the processed input data, wherein the learning data is for learning of a machine learning model;

a specific sound detection unit configured to detect a specific sound based on the machine learning model, wherein the input data includes the specific sound; and a processing unit configured to execute a specific processing on the detected specific sound.

9. The acoustic treatment device according to claim 8, wherein the specific sound is a voice of a wearer of the acoustic treatment device.

* * * * *